United States Patent [19]

Goldring

[11] Patent Number: 5,613,113
[45] Date of Patent: Mar. 18, 1997

[54] CONSISTENT RECREATION OF EVENTS FROM ACTIVITY LOGS

[75] Inventor: Robert D. Goldring, Morgan Hill, Calif.

[73] Assignee: International Business Machines Corporation, Armonk, N.Y.

[21] Appl. No.: 483,593

[22] Filed: Jun. 7, 1995

Related U.S. Application Data

[63] Continuation of Ser. No. 134,766, Oct. 8, 1993, abandoned.

[51] Int. Cl.$^6$ ................................................. G06F 17/30
[52] U.S. Cl. ........................ 395/618; 395/608; 395/617; 395/230; 364/282.1; 364/DIG. 1
[58] Field of Search ........................ 395/600; 364/270.5, 364/225.2, 282.4, 918.2, 285.2

[56] References Cited

U.S. PATENT DOCUMENTS

| | | | |
|---|---|---|---|
| 4,631,673 | 12/1986 | Haas et al. | 395/600 |
| 5,043,866 | 8/1991 | Myre, Jr. et al. | 395/600 |
| 5,155,850 | 10/1992 | Janis et al. | 395/600 |
| 5,230,073 | 7/1993 | Gausman et al. | 395/600 |
| 5,263,156 | 11/1993 | Bowen et al. | 395/600 |
| 5,280,611 | 1/1994 | Mohan et al. | 395/600 |
| 5,287,496 | 2/1994 | Chen et al. | 395/600 |

OTHER PUBLICATIONS

Tony P. Ng, "Propagating Updates in a Highly Replicated Database," in *Proceedings of the Sixth International Conference on Data Engineering*, Los Angeles, California, Feb. 5–9, 1990, pp. 529–536.

Gio Wiederhold and Xiaolei Qian, "Consistency Control of Replicated Data in Federated Databases," *Proceedings, Workshop on the Management of Replicated Data*, Houston, Texas, Nov. 8–9, 1990, pp. 130–132.

Bo Kähler and Oddvar Risnes, "Extended Logging for Database Snapshot Refresh," *Proceedings of the 13th International Conference on Very Large Data Bases*, Brighton, England, Sep. 1–4, 1987, pp. 389–398.

*Primary Examiner*—Thomas G. Black
*Assistant Examiner*—Hosain T. Alam
*Attorney, Agent, or Firm*—Baker, Maxham, Jester & Meador

[57] ABSTRACT

A computing system associates time series data with data base changes, received from concurrent processes, that are recorded in an activity log by defining a data base table to include a column in which a system clock time stamp value can be recorded when initializing a new copy of the data. Initialization can be set to occur automatically at periodic intervals or whenever a fresh copy of a set of data records is requested by a system process. The writing of the time stamp data associates a time value with the copy initialization activity and makes time series data available to processes that otherwise would have no time knowledge. The prior user-defined data base does not have to be modified to utilize the time stamp feature because a new, system-defined table is used.

17 Claims, 5 Drawing Sheets

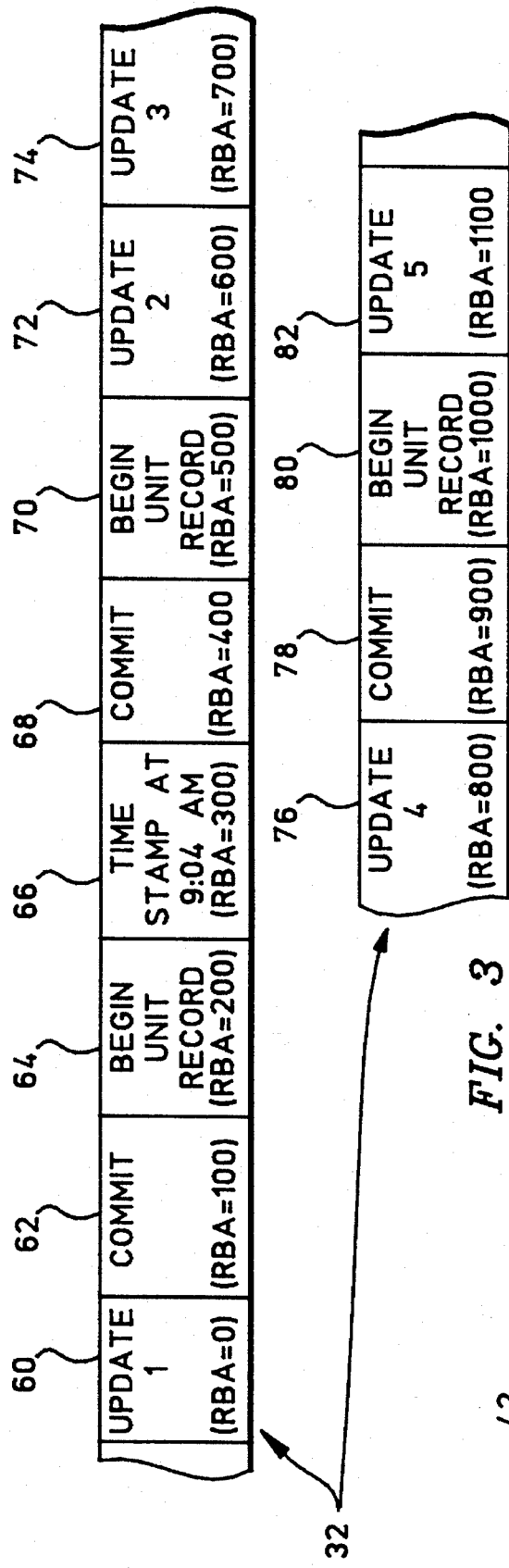

CONSISTENT RECREATION OF EVENTS FROM ACTIVITY LOGS

CROSS-REFERENCE TO RELATED APPLICATIONS

This application is a continuation of U.S. patent application Ser. No. 08/134,766, filed Oct. 8, 1993, now abandoned.

This application is related to the application entitled "Lossless Distribution of Time Series Data in a Relational Data Base Network" by Robert Goldring filed Oct. 8, 1993, now U.S. Pat. No. 5,553,279 issued on Sep. 3, 1996, and the application entitled "Simplified Relational Data Base Snapshot Copying" by Robert Goldring, also filed Oct. 8, 1993, now U.S. Pat. No. 5,440,735 issued on Aug. 8, 1995.

BACKGROUND OF THE INVENTION

1. Field of the Invention

This invention relates generally to computer systems for managing sequences of computer system events with respect to collections of data and, more particularly, to systems that can read a log of events and correlate the events with time.

2. Description of the Related Art

Many computer processes involve a sequence of events that are carried out with respect to a collection of data. For example, a file server system might service a plurality of users that request access to copies of data files. Responding to the requests for copies is seen by the system as a sequence of computer events. These responses must be managed so that requests are filled in a timely and efficient manner. Another example of managing a sequence of events is that of a data base manager, which might field search query requests concerning a data base from multiple users and return data fitting the query requests. The requests constitute a sequence of events that must be received and processed. Another computer process that involves a sequence of events would be a commercial order filling or banking system that receives orders or account changes that must be tended to in a transactional, or atomic work order fashion.

It frequently is important for such systems to keep track of the sequence of events in an activity log and then later consult the log to trace the events. This is useful, for example, in recovering from a system malfunction or equipment failure. It also is useful in permitting users to operate on a data base while collecting those events in an activity log to permit other users to periodically analyze the sequence of events without concern for continuing changes. Many such systems record the events in the log at a time interval that is relatively small, or granular, and is not denoted in an ordering that is of interest.

For example, in a file server system, requests for files might be recorded in the sequence in which they are received, interspersed with system responses to requests or other system/user events with respect to the files. It might be desirable to consult the activity log according to the order in which files were accessed. In a data base management system, updates to tables from one user might be recorded in the log interspersed with commit records associated with those updates and also with updates and commit records from other users. An update might be received before a prior update has been implemented, or committed. It might be necessary to review the updates in the order in which they were committed or it might be necessary to consult the log in the order of received update requests. In this way, the granularity of the event sequence in an activity log might not correlate with another meaningful time series ordering of the events.

Thus, although the events are received in a time sequence, they inherently have a different ordering that might be of interest. In this way, the granularity of the event sequence in the activity log might not correlate with another meaningful time series ordering of the events. Many processing systems do not permit meaningful time series data to be associated with the events recorded in the log and accessed by users. That is, the sequence of recorded events is not readily ordered according to a meaningful time series because the time series of interest is not present in the activity log or is not readily learned by a user.

The difficulty described above is readily illustrated with respect to data base management systems. Such systems receive updates to tables in a data base from many users and write the updates to an activity log. In a relational data base within a transaction oriented processing system, data base updates comprise a sequence of change operations including a first part of the transactional update, such as an account credit, and a second part of the transactional update, such as an account debit. Each transaction also includes a commit operation that indicates to a system process that the changes specified by the first and second change operations should be implemented, or carried out. This scheme ensures that transactional updates are either fully completed or not executed and is very important for maintaining integrity of systems.

It might be necessary to trace the updates. Also, it might be desirable to permit copies of subsets of the data base made at different points in time, referred to as snapshots, to be examined by multiple users all sharing the data base. It also might be desirable to permit users looking for specific information in the data base to examine the snapshots. In either case, multiple copies of data records facilitate concurrent use at many geographic locations. If changes to the data base are made after the time a copy was made, then users will be examining incorrect, out of date information. To ensure accurate information, it is necessary to trace the data base updates since the time a snapshot copy was initially made.

Unfortunately, the activity log might not be easily accessed by an end user, if at all, and the events in the activity log may be recorded on a very granular level. That is, the change operations are recorded in the activity log in the order in which they were received from users. To trace the changes and recreate the condition of the data base at various points in time, it is necessary to join up the change operations with the commit operations to synchronize the records in the activity log with the changes that actually were committed. Time series data must be associated with the sequence of changes as they are committed in the activity log, so the proper sequence of changes to the various snapshot copies can be made.

If a transaction-oriented data base management system uses synchronous replication, then each snapshot copy is readily associated with time series data, or system clock data, which provides the necessary time context. For many reasons, however, asynchronous replication is favored over synchronous replication. Asynchronous replication, for example, permits the data replication stages to overlap within a transaction and among different transactions, which can be more efficient than synchronous replication. Unfortunately, time series data is not readily available to the asynchronous processes.

Data base management systems generally assign each update a binary transaction sequence number that also is recorded in the log, but in an asynchronous process these sequence numbers do not incorporate time series data. Taking the time to write time series data with each event that is recorded would create noticeable delay for an updating transaction. Also, in many cases, the process that writes the activity log might not have access to time series data or for some other reason might not denote time sequence in the activity log. Thus, in practice, it can be very difficult to determine the correct location of the activity log at which to begin tracing. It would be advantageous to have knowledge of clock time associated with updates to a data base for faster update tracing without requiring excessive overhead. Moreover, it would be very difficult to provide this information within the existing data structures in the data base. It would be advantageous to provide time series data without requiring extensive modification of existing data base tables and structures.

Thus, although computing systems record events in an activity log, the granularity of the event sequence in the log might not correlate with another meaningful time series ordering of the events. In addition, it can be very difficult to provide useful time series data to be associated with the events recorded in the log and to be accessed by users. It generally is very difficult to provide such time series data without extensive modification of existing processing systems or existing data structures in such systems.

From the discussion above, it should be apparent that there is a need for a computer processing system that can correlate events in an activity log with time series data of interest and permit examination of the correlated events by multiple users. The present invention satisfies this need.

SUMMARY OF THE INVENTION

In accordance with the invention, a computing system correlates events according to a time series ordering of an event characteristic of interest by recording the events in an activity log as they occur and periodically recording time series data in the log, reading the activity log and identifying a time series data value of interest, reading the log from the time of interest and identifying the recorded events having the characteristic of interest, and correlating the identified events with the most recently read time data. When the activity log is read, the time series data can be easily located and used to associate the time data value with the other events recorded in the log up to the next recorded time value. The time data is recorded at intervals that provide meaningful time series ordering of the events in the activity log. Existing data structures do not have to be modified to utilize the time series data feature because a new, relatively simple data structure is used. This reduces the amount of modification to existing systems that otherwise would be necessary to implement the feature. System routines that read the activity logs can be easily modified by those skilled in the art to search the activity log for the time series data, filter out those events not having the characteristic of interest, and order the remaining events in a meaningful sequence.

The invention has particular application to data base management systems that assign user table update transactions a binary sequence number and store change operations and commit commands in an activity log along with their assigned transaction numbers, but do not record time series data. Thus, update transactions correspond to the recorded system events and the event characteristic of interest corresponds to transactions that are committed. In accordance with the invention, a clock time value is periodically recorded in the activity log. The time value can be easily retrieved from the activity log and associated with the transaction sequence numbers of the events recorded in the log. To record the time value at meaningful intervals, the recording of the time value can occur, for example, whenever a user initializes a new copy of an existing data table via a snapshot request. The frequency of copy initialization provides time stamp values in the activity log at sufficient intervals to permit time series association of table updates without excessive overhead. The invention therefore permits easy synchronization between time series data and the events stored in the activity log, without adding excessive system modification or overhead.

In one aspect of the invention in connection with a data base management system that automatically stores updates to data tables in an activity log, a new data table is defined that includes time series data. The time series data table is periodically updated with time series data. Because every update to the table constitutes an event that triggers an automatic write by the data base management system to the activity log, the update of the table creates a time value in the activity log that can be easily retrieved from the log and associated with the transaction sequence numbers. The update of the time series data table can occur, for example, whenever a user initializes a new copy of an existing data table. The frequency of copy initialization provides time stamp values in the activity log at sufficient intervals to permit time series association of table updates without excessive overhead. The invention therefore permits easy synchronization between time series data and the transactions automatically stored in the activity log, without adding excessive system modification or overhead.

Other features and advantages of the present invention should be apparent from the following description of the preferred embodiment, which illustrates, by way of example, the principles of the invention.

BRIEF DESCRIPTION OF THE DRAWINGS

FIG. 3 is a representation of a portion of an activity log recorded by the system illustrated in FIGS. 1 and 2.

FIG. 4 is a representation of a row from the Change_Data table illustrated in FIG. 2.

FIG. 5 is a representation of a row from the Unit_of_Work table illustrated in FIG. 2.

DESCRIPTION OF THE PREFERRED EMBODIMENT

Figure 1:
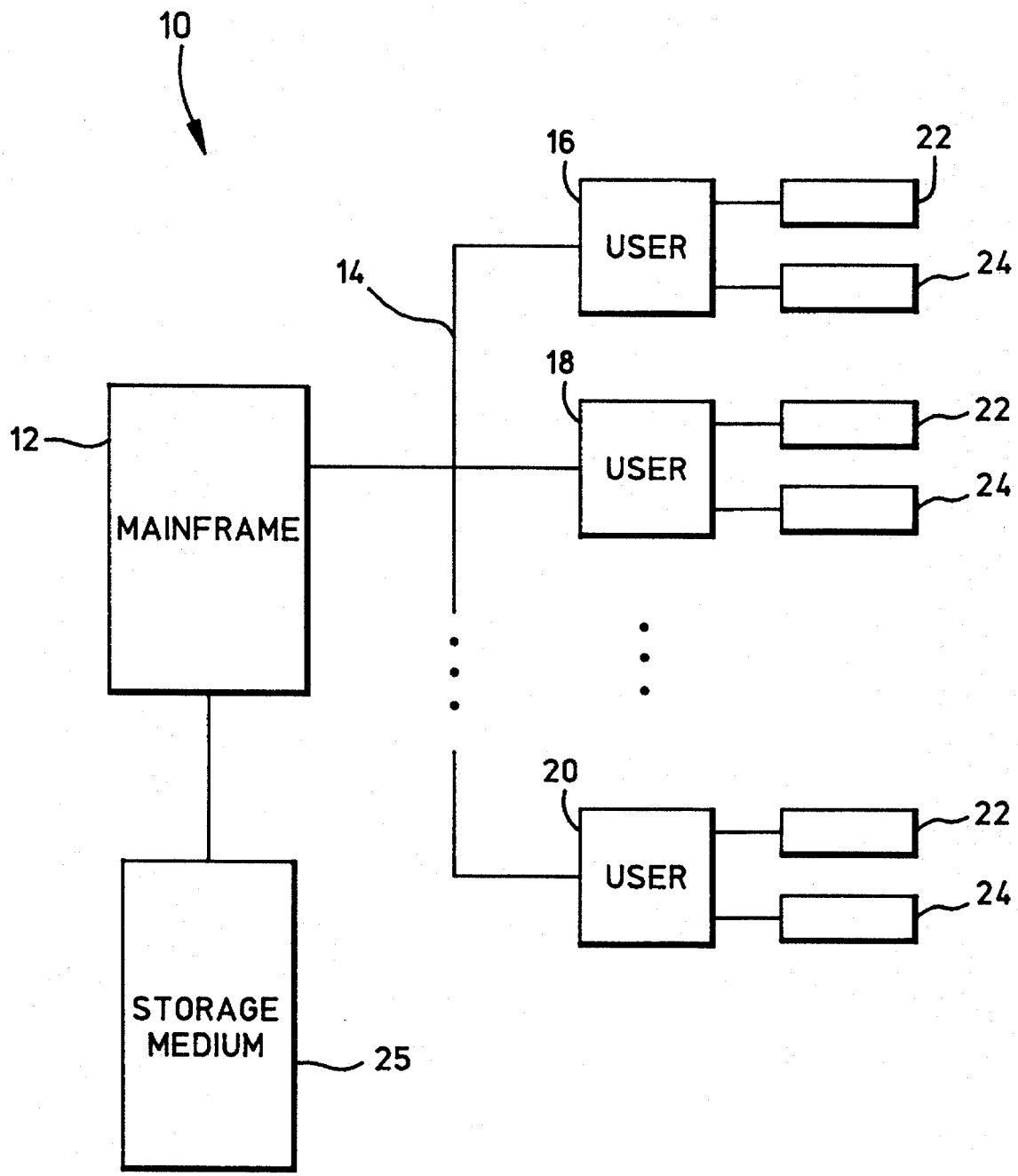
FIG. 1 is a block diagram of a computing system constructed in accordance with the present invention.
Figure 2:
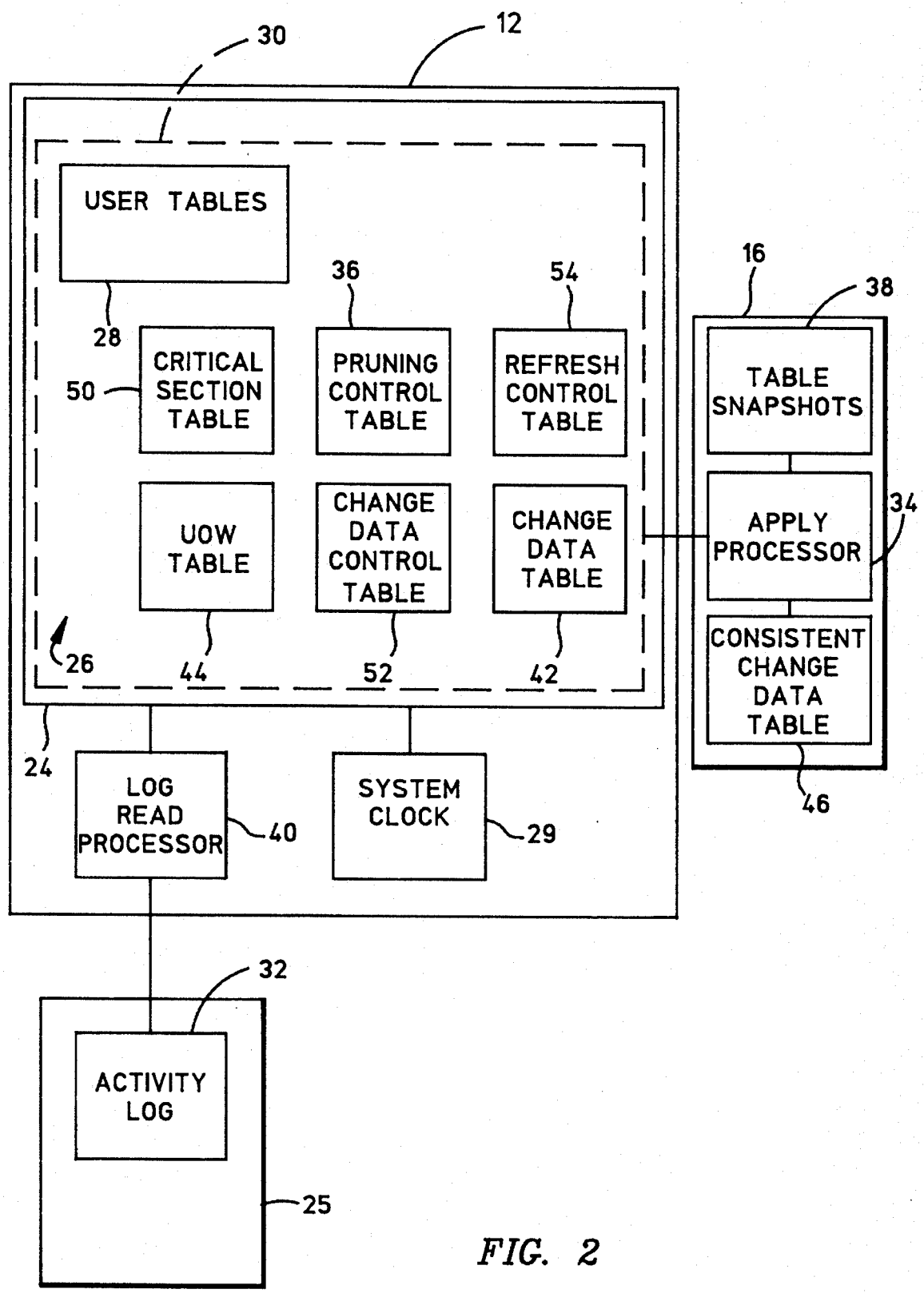
FIG. 2 is a detailed block diagram of the central processor, storage medium, and a single user of the system illustrated in FIG. 1.

With reference to the block diagrams of FIG. 1 and FIG. 2, a computing system 10 constructed in accordance with the present invention includes a central processor 12, such as an International Business Machines Corporation (IBM Corporation) "System/390" mainframe computer, and a plurality of user terminals connected to the central processor by a network 14. In FIG. 1, three users 16, 18, 20 are illustrated for purposes of example. Each user comprises a processor, such as an IBM Corporation "PS/2" personal computer, and includes a user display device, such as a video display 22, and an interactive input device, such as a keyboard 23. The mainframe computer includes a memory unit 24. A non-volatile storage medium 25 is connected to the mainframe computer. FIG. 2 shows the mainframe computer and one of the users 16 in greater detail. The flow of data is indicated by the solid lines. As illustrated in FIG. 2, the mainframe computer 12 includes a data base comprising a plurality of data tables 26 including user tables 28 defined by the users, only one user 16 of which is illustrated for simplicity. The mainframe also includes a system clock 29 that is constantly updated while the mainframe is operated and controls the mainframe operations. A data base manager 30 automatically assigns transaction numbers to the updates and records the updates and transaction numbers in an activity log 32 that is kept in the non-volatile storage medium 25. The data base manager can be any one of many data base management systems well-known to those skilled in the art. For example, IBM Corporation produces a data base management system known as "DB2". The data base manager is illustrated in FIG. 2 with dashed lines to emphasize that it provides an interface between the processes and tables in the mainframe computer and all outside processes.

In accordance with the invention, an Apply Processor 34 in each user associates time series data with data base changes by defining a data base table 36, which will be referred to as the Pruning_Control table, to include a column in which a time value from the system clock 29 is recorded whenever a new copy of a user table is initialized. Because writing the system clock value into the table constitutes a table update, the data base management system 30 automatically writes the activity into the activity log 32 with an associated binary transaction sequence number. The activity log can then be consulted and the system clock value located for association with the other updates in the activity log. In this way, the writing of the clock value places a time stamp in the activity log without modifying the user-defined data base tables 28. This reduces the amount of modification to existing systems that otherwise would be necessary to implement the time recording feature. System routines that read activity logs can easily be written by those skilled in the art to search the activity log for time stamp data, filter out those transactions that have not been committed, and order the transactions appropriately to permit tracing of updates. Alternatively, existing system routines that read activity logs can be easily modified by those skilled in the art to perform the same functions.

The data base manager 30, for example, can comprise a software process that operates in accordance with Structured Query Language (SQL) requests, a language that is well-known to those skilled in the art. The data base manager resides in the program memory of the mainframe computer and provides an interface for the users. A user 16 can interactively communicate with the data base manager through the keyboard 23 and video display 22 to define data tables and update them. The data base manager 30 will automatically create the activity log 32 and write change operations into it, thereby maintaining a change history of the data base. For example, in a transaction-oriented data base, users generate transactional updates that comprise paired change operations. In a banking system, such paired change operations might constitute a debit to a first account, or data table, and a credit to a second account, or data table. The user who generates the transactional update would complete the transaction by generating a commit operation, a standard SQL process known to those skilled in the art. Each time a user generates an update, the data base manager will assign the update a transaction number comprising a unique, ascending binary number and will record the information in the activity log. Thus, the data base manager automatically writes the change operations and commit operations into the activity log, along with their associated binary transaction numbers.

The Apply Processor 34 can comprise a software process that resides in the program memory of each user 16, 18, 20. The Apply Processor takes advantage of the automatic writing to the activity log 32 by the data base manager 30 by generating the time stamp Pruning_Control data table 36 and updating the time stamp values contained therein. The data base manager interprets a modification to the Pruning_Control table as just another user modification of a data table and therefore assigns the event a transaction number. The data base manager then writes the time stamp value change operation to the activity log 32 with the transaction number. If the activity log is later consulted, the time stamp values can be located with their corresponding transaction sequence numbers and accessed by users. For example, the time stamp value can be correlated with activity log events following the time stamp, until the next time stamp is encountered.

The processing of the system 10 will next be described in greater detail. In addition to supporting tracing after a system malfunction or equipment failure, the data base manager also supports many concurrent users 16, 18, 20 all defining and updating data tables independently of each other. All of the change operations input by the users must be written to the activity log 32. The data base manager also permits users to make read-only copies 38, or snapshots, of the data base at particular points in time for analysis. If a copy of a source data table were initialized every time a user operated on the data table and updated it, then excessive processing time and communication resources would be spent accessing the source data tables. Therefore, multiple copies of the data tables must be provided. The system 10 supports using multi-generational copies of data tables for user updates. This permits maintaining user copies of data tables from intermediate copies, thereby reducing the time spent accessing the source data tables and improving efficiency. Therefore, the change operations generated by users must be propagated throughout the system to ensure that all copies of data tables are kept current. Thus, writing the change operations to the activity log is motivated not only by the need for maintaining a change history for tracing purposes, but also to support concurrent users without excessive overhead.

Writing time stamp values with great frequency, such as with every update, would cause noticeable delay in system operation, and therefore the Apply Processor 34 only periodically writes the time stamp value to the Pruning_Control table 36. For example, when a user 16 wants to examine one of the user data tables 28, the user must first initialize a snapshot copy. The Apply Processor selects the copy initialization as one of the commands for which it will also update the Pruning_Control table. A copy initialization is commonly referred to as a full refresh operation.

As described above, subsequent requests for a snapshot 38 need not initialize yet another copy of the user table to create an updated snapshot. Rather, only the change operations since the time of last initialization or update need be propagated to each user. The change operations can be applied to the snapshot copy kept by a user, thus ensuring a current data table copy. Such an update is referred to as a differential refresh operation. The change operations since the time of initialization or last differential refresh can be located in the activity log 32. The updates themselves do not include time series data. Without the Pruning_Control time stamp data provided by the invention, it would be extremely difficult to determine the point in the activity log at which to begin propagating updates to a snapshot 38.

When the activity log 32 is read, a time stamp value eventually will be located, because new copies of various data tables are constantly being initialized by the Apply Processor 34 as one user or another requests a snapshot 38. Thus, the activity log does not have to be reviewed for a very long time before a time stamp value will be encountered. Depending on the needs of the users, the Apply Processor could also update the Pruning_Control table 36 at regular time intervals, such as hourly, daily, or weekly. In all cases, updating the Pruning_Control table results in writing the time stamp value to the activity log 32, which is then readily available to all users 16, 18, 20. Propagating updates is made easier because the periodic time stamp values provide a synchronizing event that a tracing process can look to when reviewing the activity log.

To read the activity log, the system 10 includes a Log Read Processor 40 that reads the entries in the activity log 32 and transfers the information from the log to two system tables, a Change_Data table 42 and a Unit_of_Work (UOW) table 44. The Log Read Processor preferably resides in the mainframe computer 12. The system 10 generates one Change_Data table for each of the user source tables 28 and one global UOW table for the system. The Log Read Processor will read the activity log and will extract from the log, for insertion into the Change_Data table, data identifying the transaction, an intent sequence number for a change operation within a transaction, and an identifier of the type of change operation being performed. Those skilled in the art will recognize such parameters as being common to many different data base manager systems, though perhaps referred to by alternative names.

The Log Read Processor 40 also will extract, for insertion into the UOW table 44, data from the activity log 32 identifying the transaction, the commit sequence number, and a time stamp corresponding to the approximate mainframe computer central processor time when the change operation was committed by a user. The commit sequence number corresponds to the transaction number of the commit command for a committed transaction. Thus, the UOW table will contain only committed updates. In the preferred embodiment, the Log Read Processor also extracts an authorization token associated for the transaction, but this is implementation-dependent and those skilled in the art will recognize that the authorization token may not be necessary for certain applications.

A Consistent_Change_Data table 46 is generated by the Apply Processor 34, comprising only updates that have been committed. This table is formed by performing an SQL join operation on the Change_Data 42 and UOW 44 tables. Those skilled in the art will recognize that the Consistent_Change_Data table is not really necessary for operation of the system; the information it contains can be obtained by joining records from the UOW and Change_Data tables as needed. Maintaining the Consistent_Change_Data table, however, does reduce processing time when such information must be obtained repeatedly.

The Pruning_Control table 36 is used to indicate the number of user table copies provided to the users. There is one row in the Pruning_Control table for each snapshot table 38 that is refreshed from the Change_Data table 42. More particularly, the Pruning_Control table is defined by entries that specify the name of a copy, where the table copy is stored and will be refreshed, a time stamp, a pruning limit sequence number, an identifier for the user where the copy definition is stored, and an identifier for the copy structure. When a snapshot table copy is being initialized, the Apply Processor 34 sets the pruning limit sequence number to zero. Otherwise, the limit sequence number reflects the relative byte address in the activity log 32 where the change operation is located.

The Log Read Processor 40 also generates a table called a Critical_Section table 50. The Critical_Section table is used to provide an implementation-independent means of obtaining exclusive access to a Change_Data table when it is being pruned. When a snapshot table is being updated, the Critical_Section table is locked in what is known as the SQL share mode, so that other snapshots may be updated but any pruning of the Change_Data table must wait. In this way, the Log Read Processor 40 and Apply Processor 34 will not conflict.

The Log Read Processor 40 also references a table called the Change_Data_Control table 52, which includes one row for each Change_Data table 42. The Change_Data_Control table will link each Change_Data table with one of the source user tables 28. The Change_Data_Control table provides a means of specifying a host of control parameters, including copy mode flags, table names, user identification, and the like. For example, the Change_Data_Control table preferably includes the name of the source user table whose updates are being propagated, the name of the Critical_Section table, the Change_Data table, the name of the Pruning_Control table 36, the sequence number of the oldest row remaining in the Change_Data table, a flag to specify whether the Change_Data table is condensed, flags to indicate whether the change data is transaction consistent or complete, along with similar parameters for the Consistent_Change_Data table.

Finally, the data base 24 includes a Refresh_Control table 54 associated with snapshot copies. The Refresh_Control table contains identifiers for a source-based table, a target table, and an indication of how refresh operations will be scheduled and carried out. For example, a refresh algorithm specified as "FA" refers to a full refresh algorithm to append rows to the copy. A refresh algorithm can be specified as "FR" for full refresh with prior delete to replace the copy. A refresh algorithm of "AO" refers to automatic refresh with logic that completes a differential refresh operation if it is not possible to distinguish between reduced update activity and a disabled log read program. A refresh algorithm "AP" refers to an operation in which the differential refresh cycle is not completed if it is not possible to distinguish between reduced update activity and log read program failure, in which case a failure is assumed and a full refresh is performed. Lastly, a refresh algorithm "EI" represents an execute immediate operation. The Refresh_Control table also includes a time stamp value that is set to null initially and whenever a full refresh (initialization) is attempted and fails. The time value otherwise corresponds to the approximate value of the last successful full refresh operation, which should correspond to the previously read time value from the activity log 32.

FIG. 3 represents a portion of the activity log 32 recorded by the data base manager 30 illustrated in FIG. 2. Various marker records, transition records, and the like are not shown for simplicity. The illustrated portion begins with an update event 60 indicated as Update 1 having a log sequence number, which in the illustrated system corresponds to the relative byte address (RBA), with a value of 0. A commit order 62 is the next event in the log, having an RBA of 100.

A "Begin Unit of Recovery" record is the next event (RBA=200) 64 indicating a recorded event. A time stamp marker having a time value of 9:04 AM is the next event 66, indicating the initialization of a table copy. The time stamp marker has an RBA of 300. An associated commit order 68 is next, having an RBA of 400. The next Begin Unit of Work record 70 occurs with an RBA of 500. This value becomes the unit of work identifier for the associated transaction. Following are three update events 72, 74, 76 having respective RBA values of 600, 700, and 800. The commit order for the three updates is the next event 78 in the log and has an RBA value of 900. Finally, the next Begin Unit of Recovery record 80 (RBA=1000) and associated update 82 (RBA=1100) are the next events in the activity log.

FIG. 4 illustrates the Change_Data table rows generated by the Log Read Processor for the activity portion of FIG. 3. The first column in the table lists the arbitrary key for indexing the table, selected as known to those skilled in the art. The next column corresponds to the activity log event, in the illustrated log comprising update events. The next column contains the unit of work identifier, which corresponds to the RBA of the begin UR event in a transaction. This number identifies the transactional update. Thus, the first three rows 82, 83, 84 of the table have identical unit of work identifiers and the last row 85 has a different unit of work identifier associated with its begin UR event. The next column in the table includes the intent sequence number, which corresponds to the RBA value of the particular event. Hence, each row associated with a transaction has a different intent sequence number.

FIG. 5 illustrates the UOW table row generated by the Log Read Processor for the activity portion of FIG. 3. Only one entry is illustrated in the table because only one transaction from the activity log excerpt has committed. The unit of work corresponding to the update event having an RBA of 1100 has not yet committed. Thus, as described above, the UOW table includes columns for the unit of work identifier, the commit sequence number (which the Log Read Processor assigns as the RBA of the transaction commit order), and the time stamp value for the most recent time stamp read from the activity log.

Figure 6:
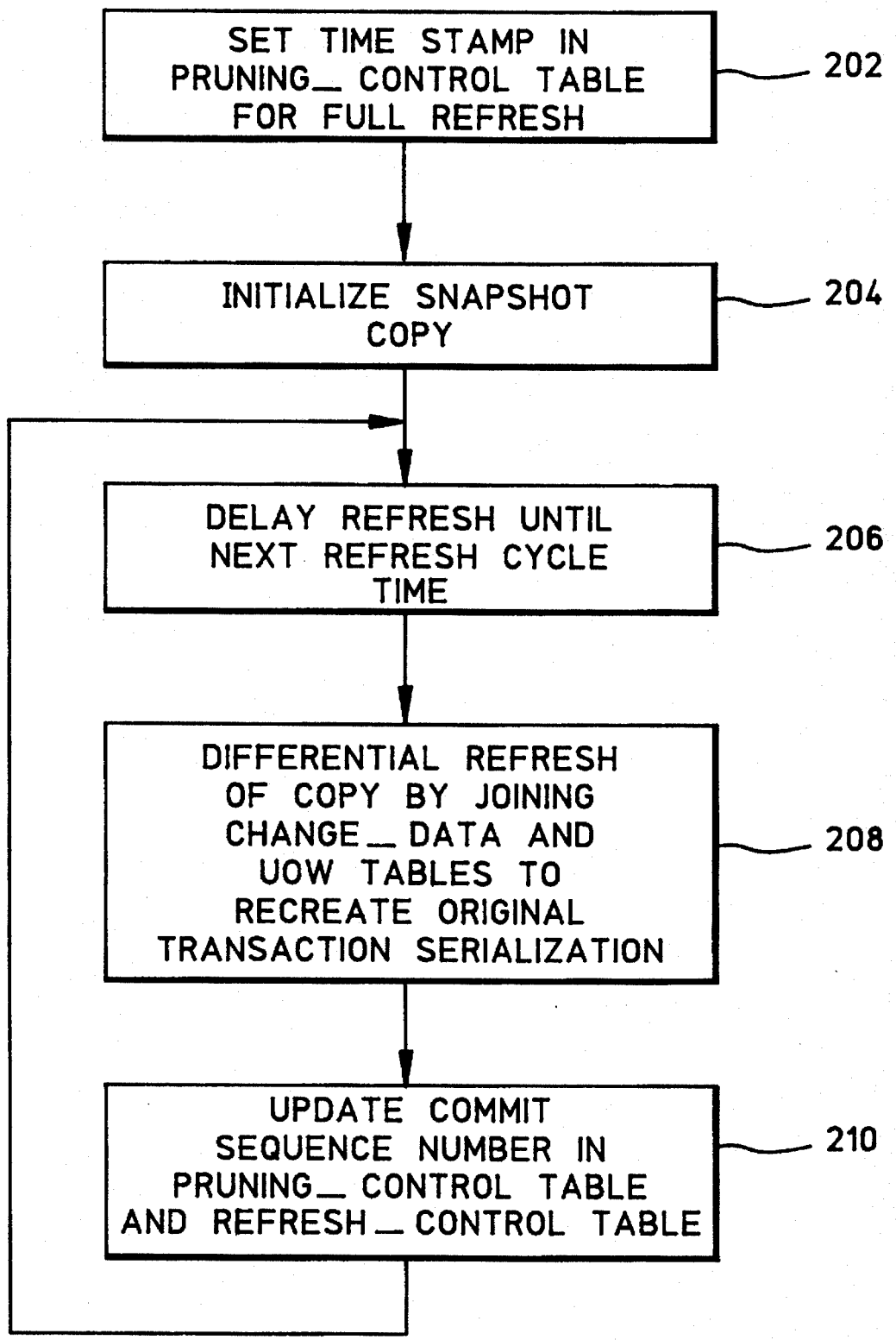
FIGS. 6 and 7 are flow diagrams of the processes carried out by the Log Read Processor and Apply Processor of the system illustrated in FIGS. 1 and 2.
Figure 7:
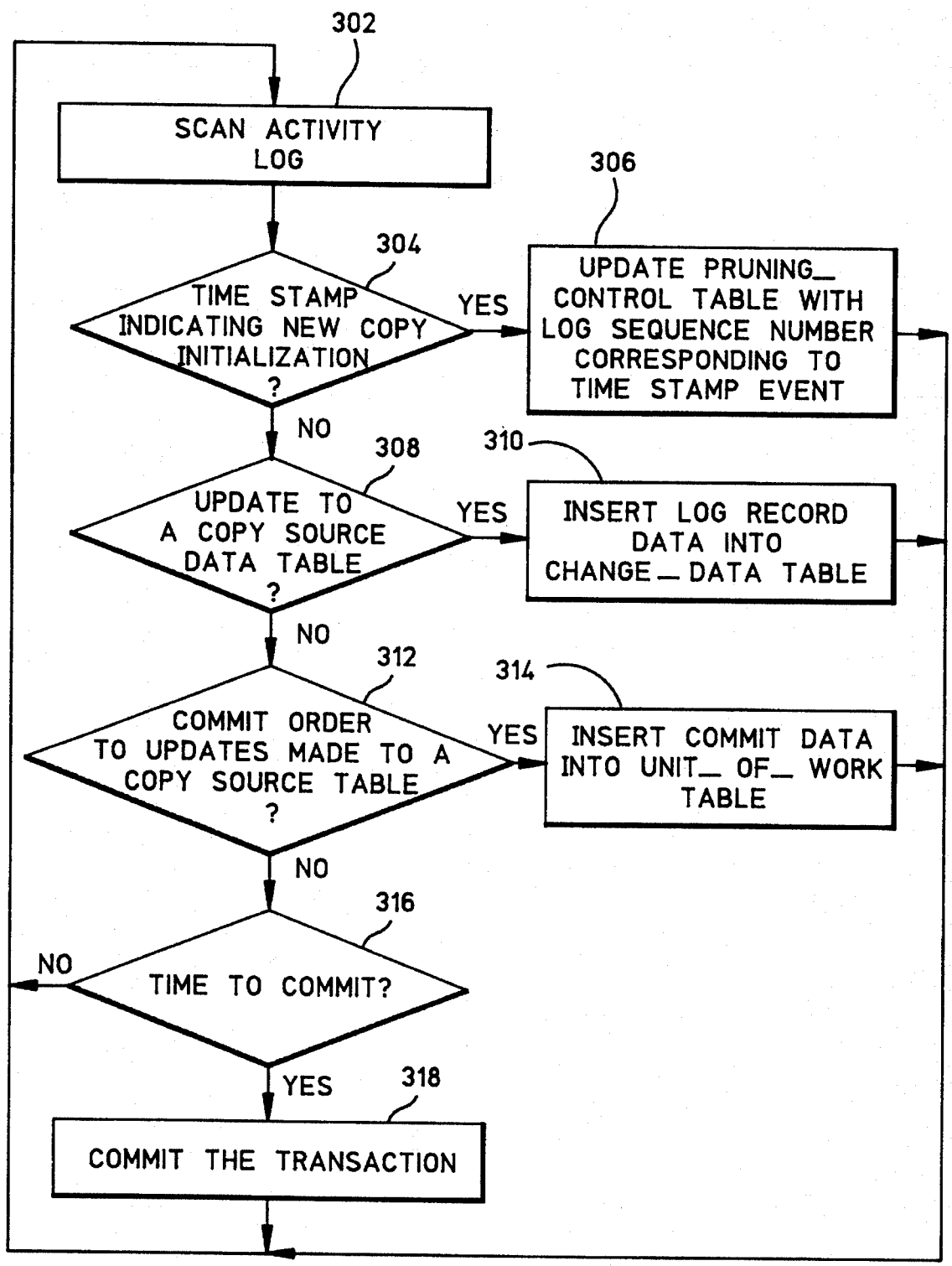

The operation of the system 10 and of the Apply Processor and Log Read Processor will next be described with reference to the flow diagrams of FIGS. 6 and 7. With respect to the general operation of the system, the data base management system schedules user applications programs and thereby permits users to make updates to the user tables. The data base manager automatically logs the updates by writing the update activity in the activity log. After each transactional update, a user either issues a commit order to commit the update or issues a roll-back order to abort the update. Turning now to FIG. 6, when a user requests a snapshot copy, at the flow diagram box numbered 202, the Apply Processor sets a time stamp value in the Pruning_Control table to indicate that a full refresh operation is desired. At the flow diagram box numbered 204, the Apply Processor initializes a snapshot copy comprising a selected portion of a user table. As part of the snapshot definition, a user specifies a refresh cycle parameter in the Refresh_Control table. At the flow diagram box numbered 206, the Apply Processor delays further refresh activity until the next refresh cycle specified by the user.

Next, at the flow diagram box numbered 208, the Apply Processor causes a differential refresh of the snapshot copy by joining the Change_Data and UOW tables to apply only updates that were committed since the last time stamp was set or since the last differentially applied updates, in the order of commit sequence number for each committed transaction. Within each transaction, the change operations are ordered by intent sequence number. In this way, the original transaction serialization is recreated at the user site. Finally, at the flow diagram box numbered 210, the Apply Processor updates the commit sequence number in the Pruning_Control table and in the Refresh_Control table to reflect the applied updates, indicating the progress in updating the snapshot copy. The Apply Processor then returns to the flow diagram box numbered 206 to wait for the next refresh cycle.

Before the Apply Processor can join the Change_Data and UOW tables, the Log Read Processor must read the activity log, extract the necessary information, and insert it into the rows of the Change_Data and UOW tables. In FIG. 7, the first step of this process is reflected at the flow diagram box numbered 302, which indicates that the Log Read Processor scans the transaction log. Next, at the decision box numbered 304, the Log Read Processor test to determine if it has read a time stamp value, from an update to the Pruning_Control table, indicating that a new snapshot copy was initialized. If the test outcome is affirmative, then at the flow diagram box numbered 306, the Log Read Processor writes an update back to the Pruning_Control table with the log sequence number corresponding to the time stamp. This time stamp value will be used to annotate all records read from the activity log until the next time stamp is read. The Log Read Processor then returns to the flow diagram box numbered 302 to read the next record.

If the outcome at the decision box numbered 304 is negative, meaning that the Log Read Processor did not read a new copy time stamp, then the processor next proceeds to check for finding an update to a table that is a source for a refresh operation, indicated at the decision box numbered 308. If the decision outcome is affirmative, then at the box numbered 310 the Log Read Processor inserts the data from the activity log record into a Change_Data table, including the intent sequence number, operation information, and unit-of-work identification. The Log Read Processor then returns to the box numbered 302 to continue reading the activity log. If the outcome at the decision box numbered 308 was negative, then at the decision box numbered 312 the Log Read Processor next determines if the record it read from the activity log was a commit operation to the updates made to a copy source snapshot table.

If the outcome of the decision box 312 is affirmative, then at box 314 the Log Read Processor inserts the commit information into the UOW table, including the best approximate commit time, the UOW identification number, and log sequence numbers corresponding to the commit time. The best approximate commit time corresponds to the most recent previously read time stamp value. The Log Read Processor then continues with processing at the box numbered 302. If the Log Read Processor did not find a copy source update commit at box 312, then at decision box 316 it determines if the threshold values indicate it is time to commit. That is, if a command indicates it is time to commit, then at box 318 the Log Read Processor issues a commit order. If it is not time to commit, then the Log Read Processor returns to the flow diagram box numbered 302 to continue processing.

Thus, the computer system 10 constructed in accordance with the invention records computer events in an activity log, periodically records a time stamp value into the log, scans the log for time stamp values of interest, and re-orders the events in the log following the time stamp value according to a predetermined activity characteristic. In the context of the relational data base system described above, the system defines data structures and takes advantage of the automatic activity log recording of updates to data tables by updating a table with time stamp values at copy initialization time, an interval selected to avoid presenting an operational burden on the system. When the activity log is read and time stamp values are located, the events read from the log can be ordered according to commit sequence.

The present invention has been described above in terms of a presently preferred embodiment so that an understanding of the present invention can be conveyed. There are, however, many configurations for data base management systems not specifically described herein but with which the present invention is applicable. The present invention should therefore not be seen as limited to the particular embodiment described herein, but rather, it should be understood that the present invention has wide applicability with respect to data bases generally. All modifications, variations, or equivalent arrangements that are within the scope of the attached claims should therefore be considered to be within the scope of the invention.

I claim:

1. A method of operating a computer data base system comprising a plurality of computer user terminals connected to a computer central processor having a memory unit, a system clock, and a non-volatile storage medium, the data base system recording a sequence of computer system events in a data base activity log of the non-volatile storage medium, the computer system events comprising data base operations generated by the user terminals, the method comprising the steps of:

recording the user terminal data base operations in the activity log automatically, as the data base operations occur, with a transaction number that is not time-ordered;

periodically generating a data base operation that comprises a time stamp event having a system clock time value and that is thereby automatically recorded in the activity log;

reading the activity log and identifying a recorded system clock time value of interest;

reading the activity log following the system clock time value of interest and identifying a computer system event having an event characteristic of interest;

storing the computer system event in a table of the memory unit and assigning the system clock time value to the computer system event; and continuing to read the activity log for a next computer system event having the event characteristic of interest; wherein:

the computer system events comprise updates to relational data base tables;

the activity log includes records of committed and uncommitted transactional updates and the event characteristic of interest comprises committed updates; and the step of reading the activity log comprises reading a log record having information including an update operation identifier, a unit of work identifier, and the transaction number.

2. A method as defined in claim 1, wherein the step of storing the event in a table of the memory unit comprises storing the update operation identifier, unit of work identifier, and intent sequence number in a Change_Data table and storing the unit of work identifier, a commit sequence number, and the most recent time value previously read from the activity log in a Unit_of_Work table.

3. A method of associating time series data in a data base management computer system in which users produce data base events that are automatically recorded in an activity log of a storage medium in the computer system according to a transaction sequence number that is not time ordered, the computer system including a central processor operating in accordance with a system clock, the method comprising the steps of:

(a) defining a time series data structure for containing time series data;

(b) selecting a predetermined data base event that occurs periodically in the computer system;

(c) generating a time series event in accordance with the selected predetermined data base event that inserts a system clock time in the time series data structure, thereby constituting a data base event that will automatically be assigned a transaction sequence number and recorded in the activity log;

(d) reading the activity log and detecting the time series event from among the other events recorded in the activity log; and (e) reading the activity log and assigning the clock time value from the detected time series event to all other events in the activity log that were recorded in the activity log after the detected time series event and before a subsequent time series event; wherein:

the predetermined event selected in step (b) comprises a user initialization of a snapshot copy in the data base management system;

the step of generating a time series event comprises updating the time series data structure with the system clock time;

the activity log includes records of committed and uncommitted transactional updates;

the step of reading the activity log and assigning the clock time to other events comprises reading a log record having information including an update operation identifier, a unit of work identifier, and an intent sequence number; and the step of assigning the clock time to other events comprises:
       storing the update operation identifier, unit of work identifier, and intent sequence number in a Change_Data table and storing the unit of work identifier, a commit sequence number, and the clock time value previously read from the activity log in a Unit_of_Work table.

4. A method of operating a computer data base system comprising a plurality of computer user terminals connected to a computer central processor having a memory unit, a system clock, and a non-volatile storage medium, the data base system recording a sequence of computer system events in a data base activity log of the non-volatile storage medium, the computer system events comprising data base operations generated by the user terminals, the method comprising the steps of:

recording the user terminal data base operations in the activity log automatically, as the data base operations occur, with a transaction number that is not time-ordered;

periodically generating a data base operation that is thereby automatically recorded in the activity log, such that the periodically generated data base operation comprises a time stamp event having a system clock time value;

reading the activity log and identifying a recorded time stamp event having a system clock time value;

reading the activity log following the identified time stamp event and identifying a computer system event having an event characteristic of interest;

storing the identified computer system event in a table of the memory unit and assigning the system clock time value of the time stamp event to the identified computer system event; and continuing to read the activity log for a next computer system event having an event characteristic of interest.

5. A method as defined in claim 4, wherein the computer system events comprise updates to relational data base tables.

6. A method as defined in claim 5, wherein the step of recording user terminal events comprises automatically recording updates to the relational data base tables in the activity log.

7. A method as defined in claim 6, wherein the step of periodically recording the time value comprises updating a relational data base table containing time value information.

8. A method as defined in claim 5, wherein the activity log includes records of committed and uncommitted transactional updates and the event characteristic of interest comprises committed updates.

9. A computer data base system that orders a set of computer system events according to an event characteristic of interest, the computer system including a plurality of computer user terminals connected to a computer central processor having a memory unit, a system clock, and a non-volatile storage medium, the data base system recording a sequence of computer system events in a data base activity log of the non-volatile storage medium, the computer system events comprising data base operations generated by the user terminals, the computer data base system further including:

a data manager that automatically records the computer system events in an activity log of the storage medium as the events occur with a transaction number that is not time-ordered;

an apply processor that periodically causes a system clock time value to be recorded in the activity log;

a log read processor that reads the activity log and identifies recorded computer system events as comprising recorded system clock time values of interest or computer system events, the log read processor responding to such reads by identifying a computer system event having an event characteristic of interest and storing the identified event in a table of the memory unit according to the event characteristic of interest and assigning the recorded system clock time value to the event; wherein:

the data manager comprises a relational data base management system;

the system events generated by the users comprise updates to user data tables of the relational data base system;

the data base management system automatically records updates to the relational data base tables in the activity log and provides user snapshot copies of the user data tables in accordance with requests from the users;

the apply processor causes a system clock time value to be recorded in the activity log by periodically updating a relational data base user table containing time value information;

the activity log includes records of committed and uncommitted transactional updates and the event characteristic of interest comprises committed updates;

the computer system event log records contain information including an update operation identifier, a unit of work identifier, and an intent sequence number; and the log read processor stores the update operation identifier, unit of work identifier, and intent sequence number in a Change_Data table and stores the unit of work identifier, a commit sequence number, and the clock time value from the activity log in a Unit_of_Work table.

10. A computing system as defined in claim 9, wherein the apply processor reads the data from the Change_Data table and the Unit_of_Work table and applies it to a snapshot.

11. A computer data base system that orders a set of computer system events according to an event characteristic of interest, the computer system including a plurality of computer user terminals connected to a computer central processor having a memory unit, a system clock, and a non-volatile storage medium, the data base system recording a sequence of computer system events in a data base activity log of the non-volatile storage medium, the computer system events comprising data base operations generated by the user terminals, the computer data base system further including:

a data manager that automatically records the computer system events in an activity log of the storage medium as the events occur with a transaction number that is not time-ordered;

an apply processor that periodically causes a data base operation comprising a time stamp event having a system clock time value to be generated and thereby automatically recorded in the activity log by the data manager;

a log read processor that reads the activity log and identifies recorded time stamp events or data base operations, the log read processor responding to such reads by identifying a system clock time value, and by identifying a computer system event having an event characteristic of interest and storing the identified computer system event in a table of the memory unit according to the event characteristic of interest and assigning the recorded system clock time value to the computer system event.

12. A computing system as defined in claim 11, wherein the data manager comprises a relational data base management system.

13. A computing system as defined in claim 12, wherein the system events generated by the users comprise updates to user data tables of the relational data base system.

14. A computing system as defined in claim 13, wherein the data base management system automatically records updates to the relational data base tables in the activity log and provides user snapshot copies of the user data tables in accordance with requests from the users.

15. A computing system as defined in claim 14, wherein the apply processor causes a system clock time value to be recorded in the activity log by periodically updating a relational data base user table containing time value information.

16. A computing system as defined in claim 15, wherein the activity log includes records of committed and uncommitted transactional updates and the event characteristic of interest comprises committed updates.

17. A computing system as defined in claim 16, wherein the computer system event log records contain information including an update operation identifier, a unit of work identifier, and an intent sequence number.

* * * * *